UNITED STATES PATENT OFFICE.

FRITZ HOFMANN AND CARL COUTELLE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING DIVINYL.

1,005,217.     Specification of Letters Patent.     Patented Oct. 10, 1911.

No Drawing.     Application filed February 3, 1910. Serial No. 541,761.

*To all whom it may concern:*

Be it known that we, FRITZ HOFMANN and CARL COUTELLE, doctors of philosophy, chemists, citizens of the German Empire, residing at Elberfeld, Germany, have invented new and useful Improvements in Processes of Producing Divinyl, of which the following is a specification.

We have found that divinyl (erythrene) can be obtained by a complete alkylation of tetramethylendiamin and by decomposition of the quaternary ammonium base. Divinyl is thus produced absolutely pure with a very good yield. The substance is intended for the manufacture of synthetic rubber and other technical products.

In order to illustrate the new process more fully the following example is given, the parts being by weight: A solution of 224 parts of potassium hydroxid in 500 parts of water is added to 88 parts of tetramethylendiamin. Then 855 parts of methyliodid are gradually introduced in small portions, the solution being cooled and the mixture is shaken until the combination with the tetramethylendiamin has taken place. The tetramethylenhexamethyldiamin-iodid thus formed of the formula:

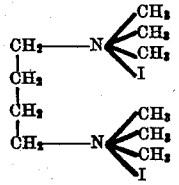

is then converted into the corresponding hydrate in the usual way *e. g.* by means of oxid of silver. The hydrate is a strongly basic almost colorless oil which hitherto could not be crystallized. It decomposes easily under suitable conditions, *e. g.* even on warming, into water, trimethylamin and the product known in literature as divinyl which can be condensed by sufficient cooling and kept in pressure bombs.

Instead of $CH_3I$ other halogen alkyls may be used, *e. g.* $ClCH_3$, etc., and also other agents of alkylation *e. g.* dimethylsulfate, etc.

The process proceeds probably according to the following equations:

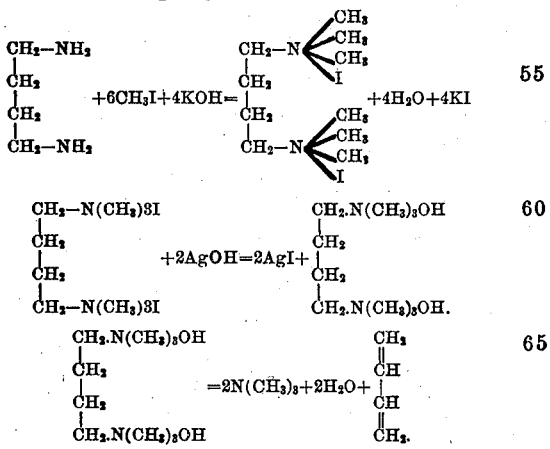

We claim:

The process of producing divinyl which consists in completely alkylating tetramethylendiamin converting the thus obtained product into the corresponding quaternary ammonium base and finally decomposing this ammonium base, substantially as described.

In testimony whereof we have hereunto set our hands in the presence of two subscribing witnesses.

FRITZ HOFMANN. [L. S.]
    CARL COUTELLE. [L. S.]

Witnesses:
  OTTO KÖNIG,
  CHAS. J. WRIGHT.